United States Patent
Chang et al.

(10) Patent No.: US 8,479,072 B2
(45) Date of Patent: Jul. 2, 2013

(54) APPARATUS AND METHOD FOR AUTOMATIC RETRANSMISSION REQUEST (ARQ) FEEDBACK IN WIRELESS COMMUNICATION SYSTEM

(75) Inventors: Young-Bin Chang, Anyang-si (KR); Taori Rakesh, Suwon-si (KR); Agiwal Anil, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 12/544,851

(22) Filed: Aug. 20, 2009

(65) Prior Publication Data

US 2010/0050037 A1 Feb. 25, 2010

(30) Foreign Application Priority Data

Aug. 20, 2008 (KR) .................. 10-2008-0081125

(51) Int. Cl.
*G06F 11/00* (2006.01)
(52) U.S. Cl.
USPC .................. 714/748; 714/18; 714/20; 714/49
(58) Field of Classification Search
USPC ...................................... 714/748, 18, 20, 49
See application file for complete search history.

(56) References Cited

U.S. PATENT DOCUMENTS

| | | | | |
|---|---|---|---|---|
| 6,496,481 B1 * | 12/2002 | Wu et al. | ........................ | 370/242 |
| 6,519,223 B1 * | 2/2003 | Wager et al. | .................. | 370/216 |
| 6,621,796 B1 * | 9/2003 | Miklos | ........................... | 370/236 |
| 6,760,860 B1 * | 7/2004 | Fong et al. | ...................... | 714/4.5 |
| 7,161,978 B2 * | 1/2007 | Lu et al. | .......................... | 375/219 |
| 8,036,101 B2 * | 10/2011 | Kim et al. | ...................... | 370/216 |
| 2003/0189892 A1 * | 10/2003 | Son et al. | ....................... | 370/208 |
| 2004/0027991 A1 * | 2/2004 | Jang et al. | ....................... | 370/230 |
| 2005/0190698 A1 * | 9/2005 | Mangin et al. | ................. | 370/236 |
| 2006/0036922 A1 * | 2/2006 | Hong et al. | ..................... | 714/748 |
| 2006/0282739 A1 * | 12/2006 | Meyer et al. | ................... | 714/748 |
| 2007/0245201 A1 * | 10/2007 | Sammour et al. | ............. | 714/748 |
| 2007/0266292 A1 * | 11/2007 | Korndewal et al. | ........... | 714/749 |
| 2007/0277072 A1 * | 11/2007 | Schaap et al. | .................. | 714/748 |
| 2007/0297325 A1 * | 12/2007 | Larsson | ......................... | 370/216 |
| 2008/0022180 A1 * | 1/2008 | Kuo | ............................... | 714/748 |
| 2008/0043619 A1 * | 2/2008 | Sammour et al. | ............. | 370/231 |
| 2008/0045255 A1 * | 2/2008 | Revel et al. | .................... | 455/510 |
| 2008/0104659 A1 * | 5/2008 | West et al. | ..................... | 725/148 |
| 2008/0212505 A1 * | 9/2008 | Jung et al. | ...................... | 370/310 |
| 2008/0215948 A1 * | 9/2008 | Pinheiro et al. | ............... | 714/748 |
| 2009/0013232 A1 * | 1/2009 | Wan et al. | ....................... | 714/748 |
| 2009/0028129 A1 * | 1/2009 | Pi et al. | ........................... | 370/351 |
| 2009/0247089 A1 * | 10/2009 | Budde et al. | ..................... | 455/69 |
| 2009/0323770 A1 * | 12/2009 | Venkatachalam et al. | ..... | 375/133 |
| 2009/0327829 A1 * | 12/2009 | Yang et al. | ...................... | 714/749 |
| 2010/0011270 A1 * | 1/2010 | Yamamoto et al. | ........... | 714/748 |
| 2010/0095181 A1 * | 4/2010 | Ma et al. | ......................... | 714/748 |
| 2010/0241919 A1 * | 9/2010 | Jeon | .................................. | 714/750 |
| 2010/0257419 A1 * | 10/2010 | Sung et al. | ...................... | 714/748 |
| 2011/0085496 A1 * | 4/2011 | Zhang | ............................. | 370/328 |

* cited by examiner

*Primary Examiner* — Loan L.T. Truong
(74) *Attorney, Agent, or Firm* — Jefferson IP Law, LLP

(57) ABSTRACT

An apparatus and a method for Automatic Repeat reQuest (ARQ) feedback in a wireless communication system are provided. A method for the ARQ feedback at a receiving end includes when receiving an ARQ block from the transmitting end, checking for error in the ARQ block, when the ARQ block has no error, initializing and driving a timer used for determining whether to perform the ARQ feedback according to reception of a next ARQ block, when receiving the next ARQ block without error before the timer expires, initializing and driving the timer, and when the timer expires, performing the ARQ feedback in relation to at least one ARQ block received without error.

22 Claims, 10 Drawing Sheets

APPARATUS AND METHOD FOR AUTOMATIC RETRANSMISSION REQUEST (ARQ) FEEDBACK IN WIRELESS COMMUNICATION SYSTEM

PRIORITY

This application claims the benefit under 35 U.S.C. §119(a) of a Korean patent application filed in the Korean Intellectual Property Office on Aug. 20, 2008 and assigned Serial No. 10-2008-0081125, the entire disclosure of which is hereby incorporated by reference.

BACKGROUND OF THE INVENTION

1. Field of the Invention

The present invention relates to an apparatus and a method for Automatic Repeat reQuest (ARQ) in a wireless communication system. More particularly, the present invention relates to an apparatus and a method for performing effective ARQ feedback in the wireless communication system.

2. Description of the Related Art

A wireless communication system can encounter data error according to the channel condition of the radio resource. In this regard, the wireless communication system controls and recovers the data error using an Automatic Repeat reQuest (ARQ) scheme to increase the transmission reliability.

Using the ARQ scheme, a receiving end informs a transmitting end of success or failure of the packet reception from the transmitting end. For example, when the packets received from the transmitting end have no error, the receiving end may send ACKnowledgement (ACK) information to the transmitting end. In contrast, when the packets received from the transmitting end have error, the receiving end sends Non-ACKnowledgement (NACK) information to the transmitting end. Herein, a series of the operations for the receiving end to transmit the success or the failure of the packet reception to the transmitting end is referred to as an ARQ feedback.

Based on the ARQ feedback, the transmitting end can determine whether the packets transmitted to the receiving end are successfully received. When determining that there has been successful packet reception at the receiving end based on the ARQ feedback, the transmitting end deletes the packets successfully received at the receiving end from its transmission buffer. When determining that there has been packet reception failure at the receiving end through the ARQ feedback, the transmitting end retransmits the original packets of the reception failure of the receiving end to the receiving end for the data error recovery at the receiving end.

The receiving end performs the ARQ feedback in various manners according to a communication standard. For example, the receiving end may perform the ARQ feedback only when the received packets are corrupted. Alternatively, the receiving end can perform the ARQ feedback according to ARQ feedback indication information in data received from the transmitting end. Alternatively, without determining whether to perform the ARQ feedback or defining the ARQ feedback time, the receiving end itself may determine and carry out the ARQ feedback.

When the receiving end performs the ARQ feedback according to the ARQ feedback indication information provided from the transmitting end, the transmitting end, which has to include an ARQ feedback request indicator into every ARQ block, is subject to regular overhead. In addition, since the receiving end cannot perform the ARQ feedback without the ARQ feedback indication of the transmitting end, the degree of freedom in the ARQ feedback operation of the receiving end deteriorates.

When the receiving end itself determines and performs the ARQ feedback, the transmitting end cannot know the ARQ feedback time of the receiving end. As a result, the transmitting end cannot smoothly allocate the resource for the ARQ feedback of the receiving end. In addition, since the transmitting end performs the ARQ depending on the ARQ feedback of the receiving end, the ARQ performance disadvantageously degrades.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for performing an Automatic Repeat reQuest (ARQ) feedback at a receiving end without the control of a transmitting end in a wireless communication system.

Another aspect of the present invention is to provide an apparatus and a method for reducing overhead according to ARQ feedback in a wireless communication system.

Yet another aspect of the present invention is to provide an apparatus and a method for recovering ARQ feedback information when the ARQ feedback information is corrupted in a wireless communication system.

Still another aspect of the present invention is to provide an apparatus and a method for recovering an ARQ feedback indicator when an ARQ feedback request indicator is corrupted in a wireless communication system.

In accordance with an aspect of the present invention, a method for performing ARQ feedback to transmit an indication of one of success and failure of reception of at least one ARQ block to a transmitting end at a receiving end in a wireless communication system is provided. The method includes when receiving an ARQ block from the transmitting end, checking for error in the ARQ block, when the ARQ block has no error, initializing and driving a timer used for determining whether to perform the ARQ feedback according to reception of a next ARQ block, when receiving the next ARQ block without error before the timer expires, initializing and driving the timer, and when the timer expires, performing the ARQ feedback in relation to at least one ARQ block received without error.

In accordance with another aspect of the present invention, a method for confirming ARQ feedback information indicative of one of reception success and failure of at least one ARQ block transmitted from a receiving end, at a transmitting end in a wireless communication system is provided. The method includes, to transmit the ARQ block, initializing and driving a first timer to determine reception of the ARQ feedback information, when a next ARQ block is transmitted or the ARQ feedback information is received before the first timer expires, initializing and driving the timer, and when the first timer expires, requesting the ARQ feedback from the receiving end.

In accordance with yet another aspect of the present invention, an apparatus for performing ARQ feedback to transmit an indication of one of success and failure of reception of at least one ARQ block to a transmitting end at a receiving end in a wireless communication system is provided. The apparatus includes a receiver for receiving the ARQ block, a timer controller for, every time the ARQ block is received without error, initializing and driving a timer for determining whether to perform the ARQ feedback according to reception of a next ARQ block, and for providing expiration information of the timer to an ARQ controller, the timer driven under control of the timer controller that expires when a preset driving time elapses, the ARQ controller for checking for error in the ARQ block received through the receiver, and for controlling to perform the ARQ feedback in relation to at least one ARQ block received without error when the expiration information of the timer is provided from the timer controller, and a transmitter for transmitting the ARQ feedback information to the transmitting end under control of the ARQ controller.

In accordance with still another aspect of the present invention, an apparatus for confirming ARQ feedback information indicative of one of reception success or failure of at least one ARQ block transmitted from a receiving end, at a transmitting end in a wireless communication system is provided. The apparatus includes an ARQ controller for generating one or more ARQ blocks, for assigning a sequence to the ARQ blocks, and for controlling to request ARQ feedback from the receiving end when expiration information of a first timer is provided from a timer controller, a transmitter for transmitting the ARQ blocks, the timer controller for initializing and driving the first timer to confirm reception of the ARQ feedback information every time the transmitter transmits the ARQ blocks, and for providing the expiration information of the first timer to the ARQ controller when the first timer expires, and the first timer driven under control of the timer controller that expires when a preset driving time elapses.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for performing effective Automatic Repeat reQuest (ARQ) feedback in a wireless communication system. Herein, the ARQ feedback indicates a series of operations for a receiving end in the wireless communication system using an ARQ scheme to inform a transmitting end of success or failure of packet reception from the transmitting end.

Hereinafter, the transmitting end and the receiving end include all of transmitting and receiving nodes constituting the wireless communication system, such as base station controller, base station, mobile station, and relay station.

Figure 1:
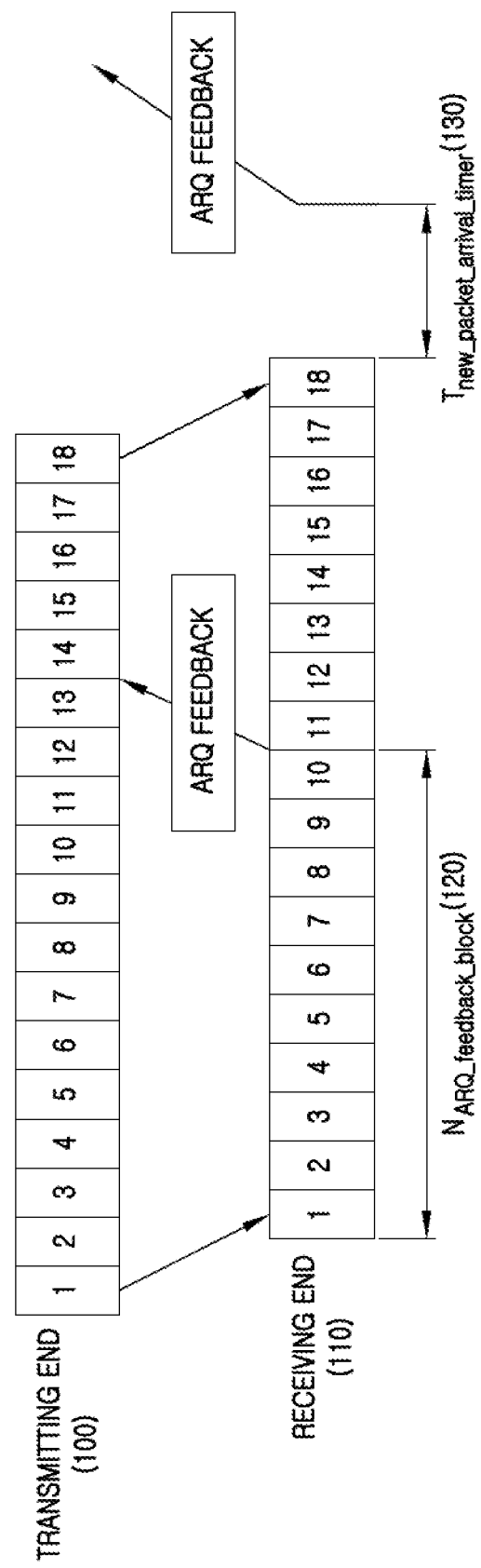
FIG. 1 illustrates an Automatic Repeat reQuest (ARQ) feedback condition at a receiving end in a wireless communication system according to an exemplary embodiment of the present invention.

The receiving end of the wireless communication system executes the ARQ feedback by taking into account a number of successfully received ARQ blocks as illustrated in FIG. 1. Herein, the ARQ block indicates a fundamental unit of data transmitted from the transmitting end to the receiving end for the ARQ scheme.

FIG. 1 depicts an ARQ feedback condition at a receiving end in a wireless communication system according to an exemplary embodiment of the present invention.

Referring to FIG. 1, when the transmitting end 100 transmits 18 ARQ blocks to the receiving end 110 and the receiving end 110 successfully receives $N_{ARQ\_feedback\_block}$ ARQ blocks 120, the receiving end 110 sends ARQ feedback information to the transmitting end 100. For example, when $N_{ARQ\_feedback\_block}$ 120 is set to 10 and the receiving end 110 successfully receives 10 ARQ blocks in succession, the receiving end 110 may send the ARQ feedback information of the first through $10^{th}$ ARQ blocks successfully received to the transmitting end 100. In so doing, the receiving end 110 initializes $N_{ARQ\_feedback\_block}$ 120, which is the criterion for determining whether to perform the ARQ feedback.

When receiving the $18^{th}$ ARQ block and not receiving new ARQ blocks within a $T_{new\_packet\_arrival\_timer}$ time 130, the receiving end 110 performs the ARQ feedback. That is, when not receiving new ARQ blocks within the $T_{new\_packet\_arrival\_timer}$ time 130 after receiving the $18^{th}$ ARQ block, the receiving end 110 recognizes that the transmitting end 100 did not additionally transmit ARQ packets. Thus, the receiving end 110 sends ARQ feedback information of the $11^{th}$ through $18^{th}$ ARQ blocks successfully received to the transmitting end 100. When the $19^{th}$ and $20^{th}$ ARQ blocks are received within $T_{new\_packet\_arrival\_timer}$ time 130 but are corrupted, the receiving end 110 recognizes that no new ARQ blocks are received.

The receiving end 110 resets a $T_{new\_packet\_arrival\_timer}$ timer, which expires after operating for the $T_{new\_packet\_arrival\_timer}$ time 130, every time the ARQ block is received. Herein, when the receiving end 110 sends the ARQ feedback information, the $T_{new\_packet\_arrival\_timer}$ timer stops to prevent the receiving end 110 from conducting the ARQ feedback while new ARQ packets are not received. The $T_{new\_packet\_arrival\_timer}$ timer is reset and driven when the receiving end 110 sends the ARQ feedback information and the reception of the new ARQ packets is successful.

As stated above, the receiving end sends the ARQ feedback information by taking into account the number of the successfully received ARQ blocks $N_{ARQ\_feedback\_block}$ and $T_{new\_packet\_arrival\_timer}$ time 130. Accordingly, within a certain time after transmitting the ARQ blocks, the transmitting end may receive the feedback of the ARQ blocks from the receiving end. Hence, the transmitting end can avoid the data transfer efficiency degradation caused by the ARQ feedback delay or the transmission delay in consideration of the ARQ feedback.

Since the receiving end performs the ARQ feedback by taking into consideration the number of the successfully received ARQ blocks, the transmitting end is able to predict the ARQ feedback time of the receiving end by considering the number of the ARQ blocks transmitted to the receiving end. Hence, the transmitting end can allocate the resource for the ARQ feedback to the receiving end by taking into account its predicted ARQ feedback time of the receiving end. That is, the transmitting end can allocate the resource for the ARQ feedback to the receiving end without the request of the receiving end.

Figure 2:
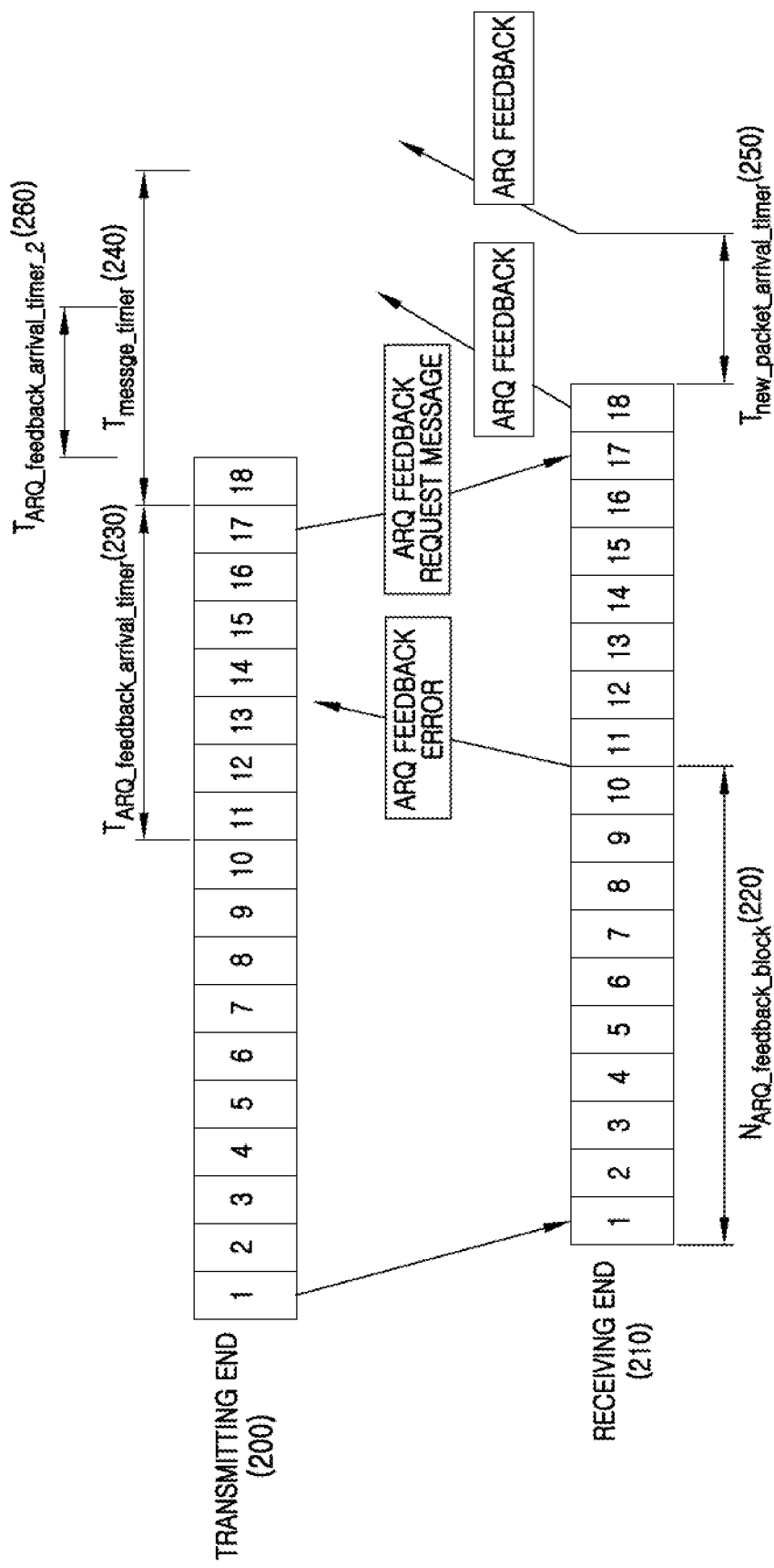
FIG. 2 illustrates an ARQ feedback condition at a receiving end in a wireless communication system according to another exemplary embodiment of the present invention.

FIG. 2 depicts an ARQ feedback condition at a receiving end in a wireless communication system according to another exemplary embodiment of the present invention.

Referring to FIG. 2, when the transmitting end 200 transmits 18 ARQ blocks to the receiving end 210 and the receiving end 210 successfully receives $N_{ARQ\_feedback\_block}$ ARQ blocks 220 as illustrated in FIG. 2, the receiving end 210 sends ARQ feedback information to the transmitting end 200. For example, when $N_{ARQ\_feedback\_block}$ $N_{ARQ\_feedback\_block}$ 220 is set to 10 and the receiving end 210 successfully receives 10 ARQ blocks in succession, the receiving end 210 may send the ARQ feedback information of the first through $10^{th}$ ARQ blocks successfully received to the transmitting end 200. In so doing, the receiving end 210 initializes $N_{ARQ\_feedback\_block}$ 220, which is the criterion for determining whether to perform the ARQ feedback.

In every transmission of the $N_{ARQ\_feedback\_block}$ ARQ blocks 220, the transmitting end 200 can expect that the receiving end 210 will conduct the ARQ feedback. For the accurate reception of the ARQ feedback information from the receiving end 210, the transmitting end 200 transmits the $N_{ARQ\_feedback\_block}$ ARQ blocks 220 and then resets a $T_{ARQ\_feedback\_arrival\_timer}$ timer, which expires after operating for a $T_{ARQ\_feedback\_arrival\_timer}$ time 230. When receiving the ARQ feedback information before the $T_{ARQ\_feedback\_arrival\_timer}$ timer expires, the transmitting end 200 aborts the operation of the $T_{ARQ\_feedback\_arrival\_timer}$ timer to avoid the transmission of an ARQ feedback request message.

Meanwhile, if the ARQ feedback information is not received before the $T_{ARQ\_feedback\_arrival\_timer}$ timer expires, the transmitting end 200 sends the ARQ feedback request message to the receiving end 210. Herein, the ARQ feedback request message includes ID information of the receiving end to which the transmitting end 200 requests the ARQ feedback, the last ARQ block information acknowledged by the transmitting end 200, and ARQ block information completely transmitted by the transmitting end 200. The transmitting end 200 generates the ARQ feedback request message in the form of a control message applying a coding that is robust to the radio channel.

After sending the ARQ feedback request message, the transmitting end 200 resets a $T_{message\_timer}$ timer, which expires after operating for a $T_{message\_timer}$ time 240. The transmitting end 200 resets the $T_{message\_timer}$ timer in order to determine whether the ARQ feedback request message has error or whether the ARQ feedback information transmitted by the receiving end 210 according to the ARQ feedback request message has error.

Upon receiving the ARQ feedback request message from the transmitting end 200, the receiving end 210 sends the ARQ feedback information to the transmitting end 200. In doing so, the receiving end 210 recognizes that the transmitting end 200 did not receive the previous ARQ feedback information. Thus, the receiving end 210 sends the previous ARQ feedback information and the ARQ feedback information up to the ARQ blocks successfully received to the transmitting end 200 until the ARQ feedback request message is received. For example, when the transmitting end 200 fails to receive the ARQ feedback information of the first through $10^{th}$ ARQ blocks successfully received at the receiving end 210, the receiving end 210 may transmit the ARQ feedback information of the first through the $17^{th}$ ARQ blocks successfully received until the ARQ feedback request message is received, to the transmitting end 200.

When receiving no new ARQ blocks during a $T_{new\_packet\_arrival\_timer}$ time 250 after receiving the $18^{th}$ ARQ block, the receiving end 210 performs the ARQ feedback. More specifically, when not receiving new ARQ blocks during the during a $T_{new\_packet\_arrival\_timer}$ time 250, the receiving end 210 recognizes that the transmitting end 200 did not transmit additional packets. Hence, the receiving end 210 sends the ARQ feedback information up to the $18^{th}$ ARQ blocks successfully received to the transmitting end 200. When the $19^{th}$ and $20^{th}$ ARQ blocks are received within the $T_{new\_packet\_arrival\_timer}$ time 250 but are corrupted, the receiving end 210 recognizes that new ARQ blocks are not received.

To accurately receive the ARQ feedback information from the receiving end 210, the transmitting end 200 resets a $T_{ARQ\_feedback\_arrival\_timer\_2}$ timer, which expires after operating for a $T_{ARQ\_feedback\_arrival\_timer\_2}$ time 260, in every transmission of the ARQ block. When receiving the ARQ feedback information before the $T_{ARQ\_feedback\_arrival\_timer\_2}$ timer expires, the transmitting end 200 stops the $T_{ARQ\_feedback\_arrival\_timer\_2}$ timer to block the transmission of the ARQ feedback request message. When not receiving the ARQ feedback information before the $T_{ARQ\_feedback\_arrival\_timer\_2}$ timer expires, the transmitting end 200 sends the ARQ feedback request message to the receiving end 210. After sending the ARQ feedback request message, the transmitting end 200 resets a $T_{message\ timer}$ timer, which expires after operating for a $T_{message\_timer}$ time 240.

As such, the transmitting end 200 can recover the error of the ARQ feedback using the $T_{ARQ\_feedback\_arrival\_timer}$ timer and the $T_{ARQ\_feedback\_arrival\_timer\_2}$ timer. Thus, it is possible to rapidly exchange the accurate information relating to the reception status of the ARQ blocks between the transmitting end 200 and the receiving end 210.

As illustrated in FIGS. 1 and 2, the receiving end carries out the ARQ feedback by taking into account the number of the successfully received ARQ blocks and the $T_{new\_packet\_arrival\_timer}$ time. The transmitting end considers the $T_{ARQ\_feedback\_arrival\_timer}$ time, the $T_{ARQ\_feedback\_arrival\_timer\_2}$ time, and the $T_{message\ timer}$ time for the sake of the accurate reception of the ARQ feedback information. The transmitting end and the receiving end determine variables for the ARQ feedback and variables for the accurate reception of the feedback information under the mutual agreement. For example, in case of a base station, a mobile station, and a relay station, the mobile station and the relay station may determine the variables for the ARQ feedback and the variables for the accurate reception of the ARQ feedback information in the process of the registration with the base station. In compliance with the Institute of Electrical and Electronics Engineers (IEEE) 802.16 standard, the base station, the mobile station, and the relay station determine the variables for the ARQ feedback and the variables for the accurate reception of the ARQ feedback information using REG-REQ messages and REG-RSP messages.

Alternatively, the transmitting end and the receiving end determine the variables for the ARQ feedback and the variables for the accurate reception of the ARQ feedback information in the process of the connection initial setup or the service initial setup. In compliance with the IEEE 802.16 standard, the transmitting end and the receiving end determine the variables for the ARQ feedback and the variables for the accurate reception of the ARQ feedback information using Dynamic Service Addition (DSA)-REQ messages and DSA-RSP messages. In addition, the transmitting end and the receiving end can modify the variables for the ARQ feedback and the variables for the accurate reception of the ARQ feedback information using Dynamic Service Change (DSC)-REQ messages and DSC-RSP messages.

The determination and the modification of the variables through the connection initial setup or the service initial setup are related to Quality of Service (QoS) of a connection between the transmitting end and the receiving end.

Figure 3:
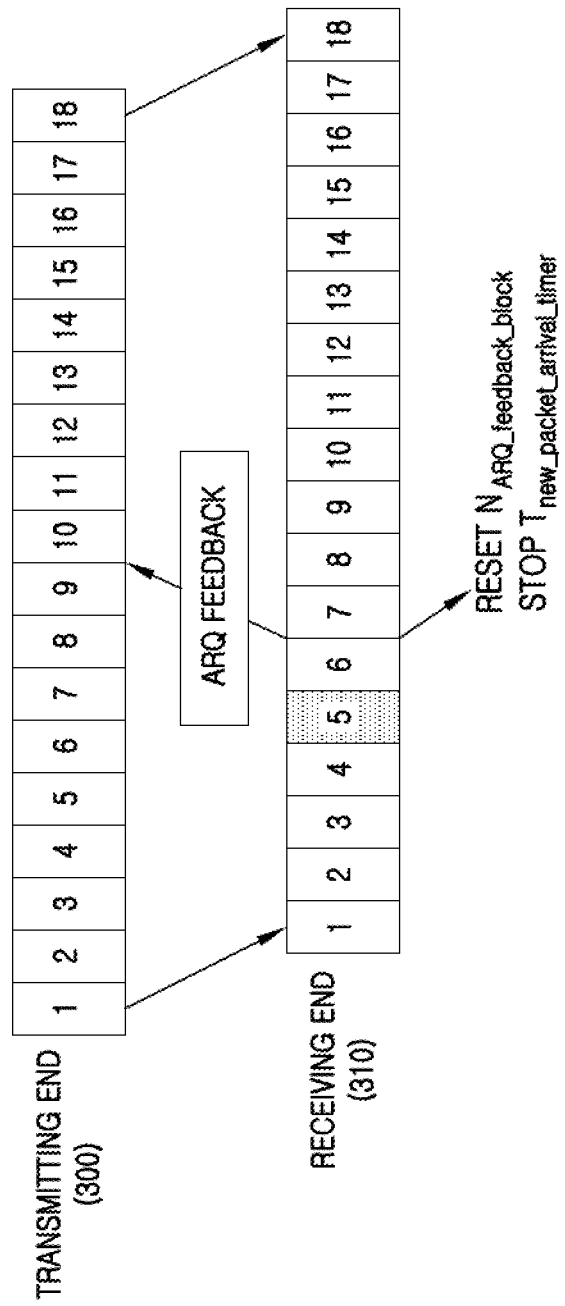
FIG. 3 illustrates an ARQ feedback condition at a receiving end in a wireless communication system according to yet another exemplary embodiment of the present invention.

FIG. 3 depicts an ARQ feedback condition at a receiving end in a wireless communication system according to yet another exemplary embodiment of the present invention.

Referring to FIG. 3, when the transmitting end 300 transmits 18 ARQ blocks to the receiving end 310 as illustrated in FIG. 3 and the receiving end 310 encounters reception error in the ARQ blocks, the receiving end 310 sends ARQ feedback information to the transmitting end 300 regardless of $N_{ARQ\_feedback\_block}$ and $T_{new\_packet\_arrival\_timer}$ values. For example, when $N_{ARQ\_feedback\_block}$ is set to 10 and the receiving end 310 successfully receives 10 ARQ blocks in a row, the receiving end 310 may send the ARQ feedback information of the first through $10^{th}$ ARQ blocks successfully received to the transmitting end 300.

However, when encountering the reception error in the $5^{th}$ ARQ block or not receiving the $5^{th}$ ARQ block at all, the receiving end 310 sends the ARQ feedback information to the transmitting end 300 to inform of the error of the $5^{th}$ ARQ block. The receiving end 310 initializes $N_{ARQ\_feedback\_block}$ and terminates the $T_{new\_packet\_arrival\_timer}$ timer.

An ARQ feedback method of the receiving end is described below.

Figure 4:
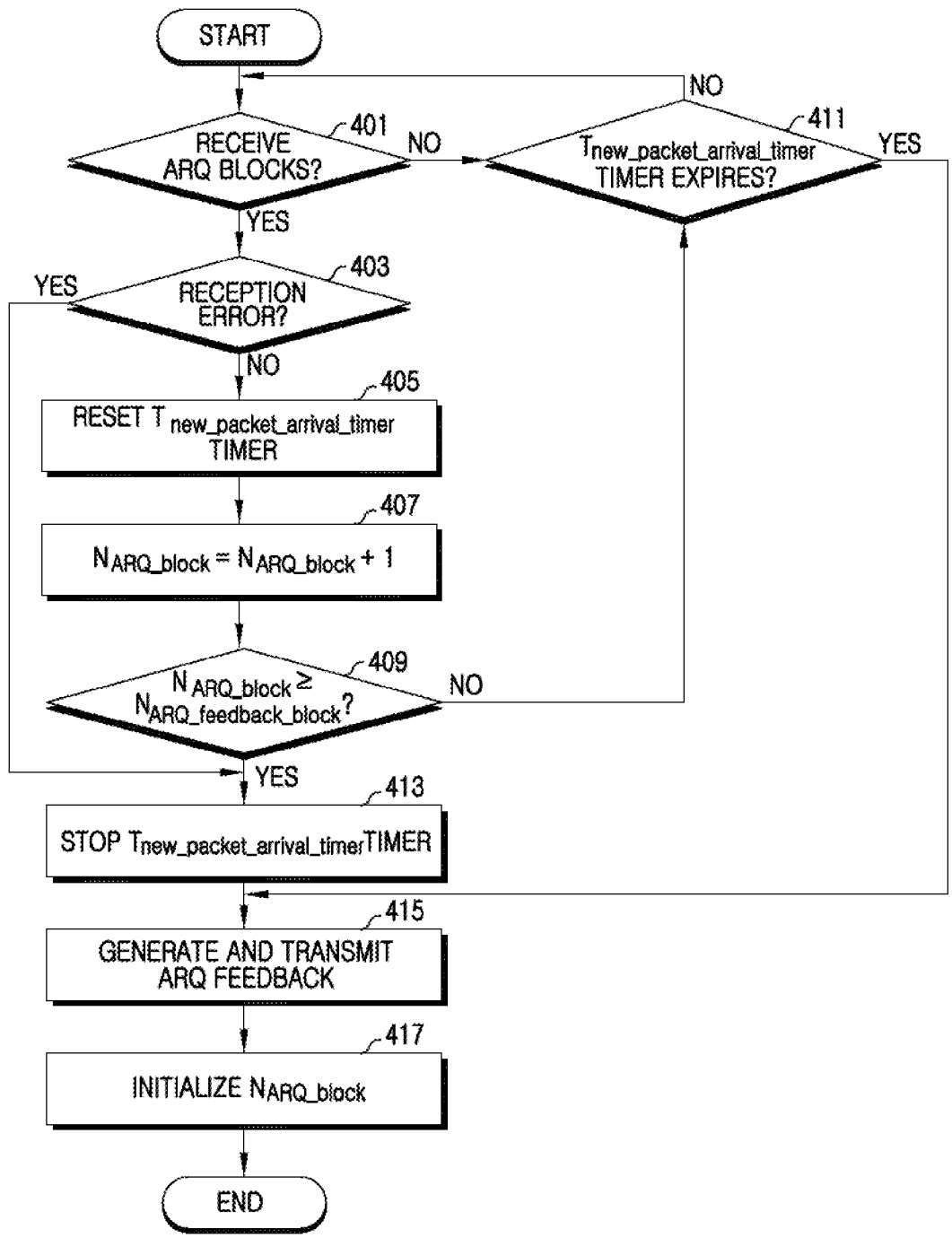
FIG. 4 illustrates an ARQ feedback method of a receiving end in a wireless communication system according to an exemplary embodiment of the present invention.

FIG. 4 illustrates an ARQ feedback method of a receiving end in a wireless communication system according to an exemplary embodiment of the present invention.

Referring to FIG. 4, in step 401, the receiving end determines whether the ARQ blocks are received from the transmitting end.

When no ARQ blocks are received, the receiving end determines whether the $T_{new\_packet\_arrival\_timer}$ timer, which expires after operating for the $T_{new\_packet\_arrival\_timer}$ $T_{new\_packet\_arrival\_timer}$ time, expires in step 411.

When the $T_{new\_packet\_arrival\_timer}$ timer expires, the receiving end generates and transmits the ARQ feedback information to the transmitting end in step 415.

When the $T_{new\_packet\_arrival\_timer}$ timer is not being operated or has not expired in step 411, the receiving end returns to step 401 and determines whether the ARQ blocks are received from the transmitting end.

When receiving the ARQ blocks in step 401, the receiving end examines whether the received ARQ blocks have error or not in step 403.

When the ARQ blocks have error, the receiving end stops the operation of the $T_{new\_packet\_arrival\_timer}$ timer to perform the ARQ feedback in step 413.

In contrast, when the ARQ blocks have no error, the receiving end resets the $T_{new\_packet\_arrival\_timer}$ timer in step 405. Herein, the resetting of the $T_{new\_packet\_arrival\_timer}$ timer indicates the initialization and the driving of the timer.

After resetting the $T_{new\_packet\_arrival\_timer}$ timer, the receiving end increases the number of the successfully received ARQ blocks $N_{ARQ\_block}$ by one ($N_{ARQ\_block} = N_{ARQ\_block}+1$) in step 407.

In step 409, the receiving end determines whether to conduct the ARQ feedback by taking into account the number of the successfully received ARQ blocks $N_{ARQ\_block}$. That is, the receiving end carries out the ARQ feedback when the $N_{ARQ\_feedback\_block}$ ARQ blocks are successfully received in a row. To determine whether to conduct the ARQ feedback, the receiving end compares the updated $N_{ARQ\_block}$ with $N_{ARQ\_feedback\_block}$ in step 409.

When the updated $N_{ARQ\_block}$ is less than $N_{ARQ\_feedback\_block}$, the receiving end determines not to perform the ARQ feedback. Accordingly, the receiving end proceeds to step 411 and determines whether the $T_{new\_packet\_arrival\_timer}$ timer reset in step 405 expires.

When the $T_{new\_packet\_arrival\_timer}$ timer has not expired, the receiving end returns to step 401 and determines whether ARQ blocks are received from the transmitting end.

In contrast, when $T_{new\_packet\_arrival\_timer}$ timer expires, the receiving end generates and transmits the ARQ feedback information to the transmitting end in step 415.

Returning to step 409, when the $N_{ARQ\_block}$ updated in step 407 is greater than or equal to $N_{ARQ\_feedback\_block}$, the receiving end determines to conduct the ARQ feedback. Accordingly, in step 413, the receiving end stops the operation of the $T_{new\_packet\_arrival\_timer}$ timer reset in step 405. That is, the receiving end stops the operation of the $T_{new\_packet\_arrival\_timer}$ timer to prevent the ARQ feedback other than the ARQ feedback determined in step 409.

After stopping the operation of the $T_{new\_packet\_arrival\_timer}$ $T_{new\_packet\_arrival\_timer}$ timer, the receiving end generates and transmits the ARQ feedback information to the transmitting end in step 415.

In step 417, the receiving end initializes $N_{ARQ\_block}$ indicative of the number of the successfully received ARQ blocks.

Next, the receiving end finishes this process.

In this exemplary embodiment, the receiving end stops the operation of the $T_{new\_packet\_arrival\_timer}$ $T_{new\_packet\_arrival\_timer}$ timer before generating the ARQ feedback information. In addition, the receiving end initializes $N_{ARQ\_block}$ after transmitting the ARQ feedback information.

Alternatively, the receiving end may stop the operation of the $T_{new\_packet\_arrival\_timer}$ timer and initialize $N_{ARQ\_block}$ before generating the ARQ feedback information.

When the ARQ blocks are corrupted, the receiving end stops the operation of the $T_{new\_packet\_arrival\_timer}$ timer in step 413.

Alternatively, when the ARQ blocks are corrupted, the receiving end may proceed to step 415.

Now, a description is provided for a method of the transmitting end to accurately receive the ARQ feedback information by taking into consideration the $T_{ARQ\_feedback\_arrival\_timer}$ time, the $T_{ARQ\_feedback\_arrival\_timer\_2}$ time, and the $T_{message\_timer}$ time.

Figure 5:
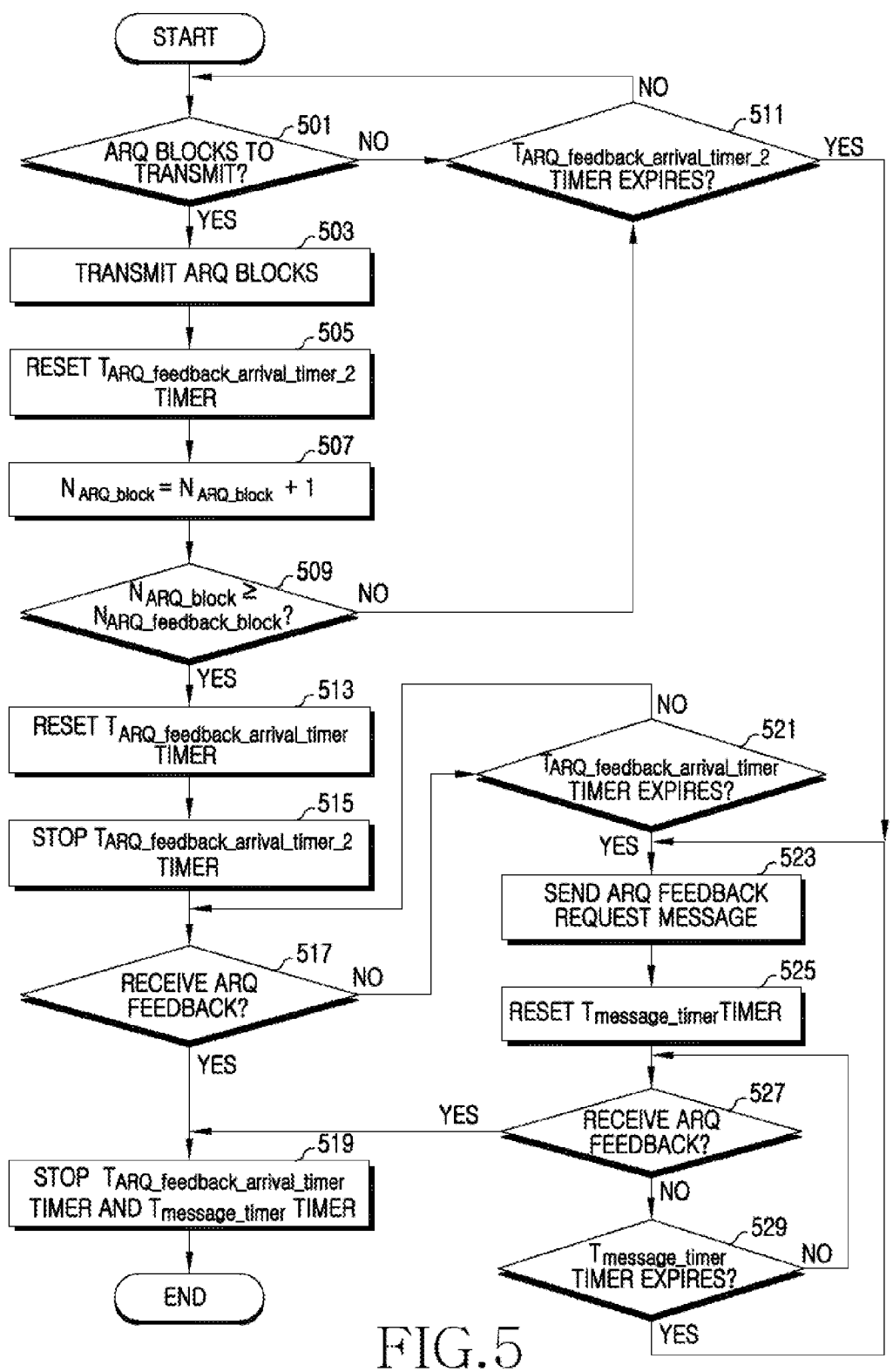
FIG. 5 illustrates a method of a transmitting end for an ARQ feedback in a wireless communication system according to an exemplary embodiment of the present invention.

FIG. 5 illustrates a method of a transmitting end for an ARQ feedback in a wireless communication system according to an exemplary embodiment of the present invention.

Referring to FIG. 5, in step 501, the transmitting end determines whether there are ARQ blocks to transmit to the receiving end.

When there are no ARQ blocks to transmit to the receiving end, the transmitting end determines whether the $T_{ARQ\_feedback\_arrival\_timer\_2}$ timer, which expires after operating for the $T_{ARQ\_feedback\_arrival\_timer\_2}$ time, expires in step 511.

When the $T_{ARQ\_feedback\_arrival\_timer\_2}$ timer expires, the transmitting end sends the ARQ feedback request message to the receiving end in step 523. Herein, the ARQ feedback request message includes ID information of the receiving end to which the transmitting end requests the ARQ feedback, the last ARQ block information acknowledged by the transmitting end, and the ARQ block information completely transmitted by the transmitting end.

When the $T_{ARQ\_feedback\_arrival\_timer\_2}$ timer is not being operated or has not expired, the transmitting end returns to step 501 and determines whether there exist ARQ blocks to transmit to the receiving end.

When there exist the ARQ blocks to transmit to the receiving end in step 501, the transmitting end transmits the ARQ blocks to the receiving end in step 503.

In step 505, the transmitting end resets the $T_{ARQ\_feedback\_arrival\_timer\_2}$ timer. Herein, the resetting of the $T_{ARQ\_feedback\_arrival\_timer\_2}$ timer initializes and drives the timer.

In step 507, the transmitting end increases the number of the ARQ blocks $N_{ARQ\_block}$ transmitted to the receiving end by one ($N_{ARQ\_block} = N_{ARQ\_block} + 1$).

In step 509, the transmitting end predicts whether the receiving end will perform the ARQ feedback, by taking into account the number of the ARQ blocks $N_{ARQ\_block}$ transmitted to the receiving end. In more detail, upon successfully receiving the $N_{ARQ\_feedback\_block}$ ARQ blocks, the receiving end performs the ARQ feedback. To predict whether the receiving end will perform the ARQ feedback, the transmitting end compares the $N_{ARQ\_block}$ updated in step 507 with $N_{ARQ\_feedback\_block}$.

When the updated $N_{ARQ\_block}$ is less than $N_{ARQ\_feedback\_block}$, the transmitting end predicts that the receiving end does not perform the ARQ feedback. Accordingly, the transmitting end proceeds to step 511 and determines whether the $T_{new\_packet\_arrival\_timer\_2}$ timer reset in step 505 expires.

When the $T_{new\_packet\_arrival\_timer\_2}$ timer has not expired, the transmitting end returns to step 501 and determines whether there exist ARQ blocks to transmit to the receiving end.

When the $T_{new\_packet\_arrival\_timer\_2}$ timer expires, the transmitting end sends the ARQ feedback request message to the receiving end in step 523.

When the $N_{ARQ\_block}$ updated in step 507 is greater than or equal to $N_{ARQ\_feedback\_block}$ in step 509, the transmitting end predicts that the receiving end will conduct the ARQ feedback. In step 513, the transmitting end resets the $T_{ARQ\_feedback\_arrival\_timer}$ timer, which expires after operating for the $T_{ARQ\_feedback\_arrival\_timer}$ time.

In step 515, the transmitting end stops the operation of the $T_{ARQ\_feedback\_arrival\_timer\_2}$ timer reset in step 505.

In step 517, the transmitting end determines whether the ARQ feedback information is received.

When not receiving the ARQ feedback information, the transmitting end determines whether the $T_{ARQ\_feedback\_arrival\_timer}$ timer reset in step 513 expires in step 521.

When the $T_{ARQ\_feedback\_arrival\_timer}$ timer has not expired, the transmitting end once again determines whether the ARQ feedback information is received in step 517.

When the $T_{ARQ\_feedback\_arrival\_timer}$ timer expires in step 521, the transmitting end sends the ARQ feedback request message to the receiving end in step 523.

In step 525, the transmitting end resets the $T_{message\_timer}$ timer, which expires after operating for the $T_{message\_timer}$ time.

In step 527, the transmitting end determines whether the ARQ feedback information is received from the receiving end.

Upon receiving the ARQ feedback information, the transmitting end stops the $T_{ARQ\_feedback\_arrival\_timer}$ timer and the $T_{message\_timer}$ timer in step 519.

When not receiving the ARQ feedback information, the transmitting end determines whether the $T_{message\_timer}$ timer reset in step 525 expires in step 529.

When the $T_{message\_timer}$ timer has not expired, the transmitting end returns to step 527 and determines whether the ARQ feedback information is received from the receiving end.

In contrast, when the $T_{message\_timer}$ timer expires, the transmitting end returns to step 523 and transmits the ARQ feedback request message to the receiving end.

When receiving the ARQ feedback information in step 517, the transmitting end stops the $T_{ARQ\_feedback\_arrival\_timer}$ timer and the $T_{message\_timer}$ timer in step 519.

Next, the transmitting end finishes this process.

Hereafter, a description is provided for a structure of the transmitting end that receives the ARQ feedback information by taking into consideration the $T_{ARQ\_feedback\_arrival\_timer}$ time, the $T_{ARQ\_feedback\_arrival\_timer\_2}$ time, and the $T_{message\_timer}$ time.

Figure 6:
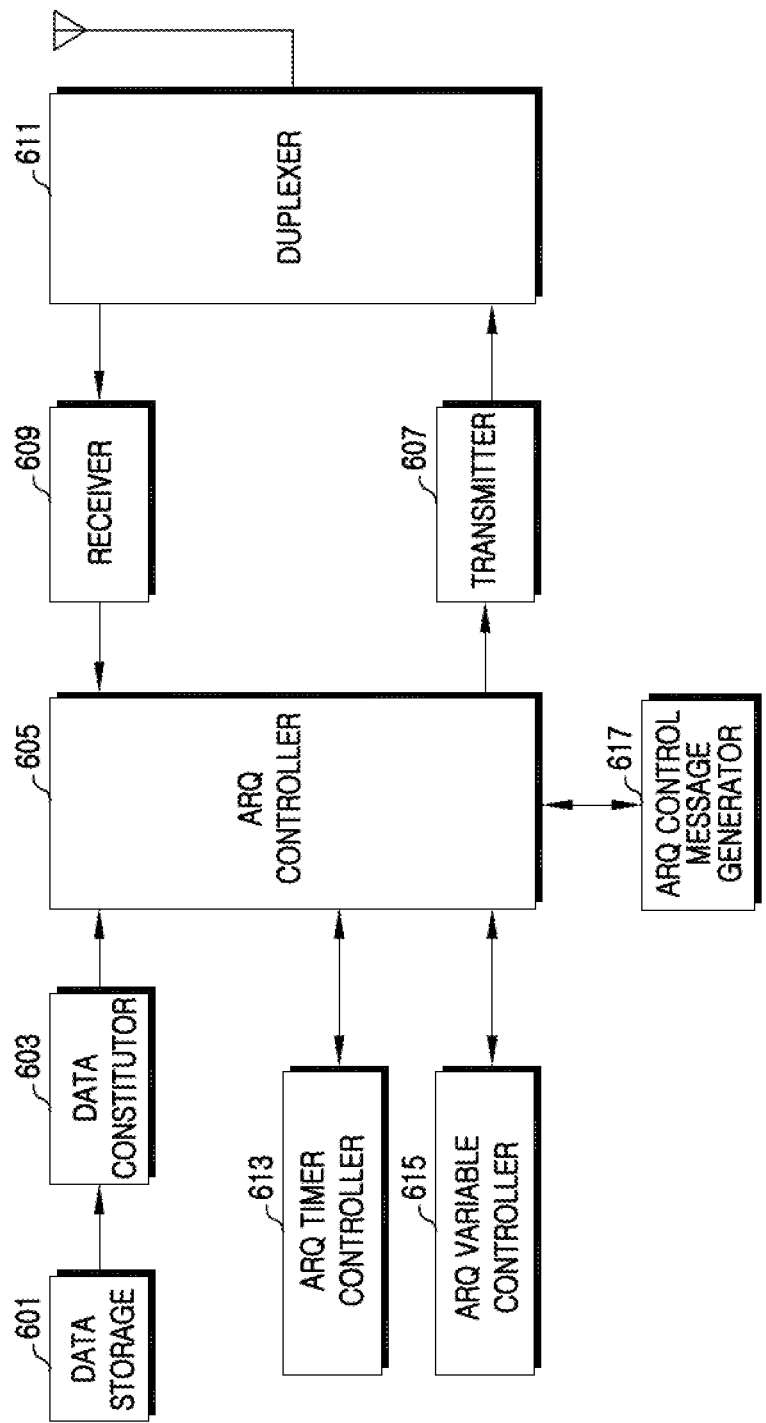
FIG. 6 illustrates a structure of a transmitting end for an ARQ feedback in a wireless communication system according to an exemplary embodiment of the present invention.

FIG. 6 depicts a structure of a transmitting end for an ARQ feedback in a wireless communication system according to an exemplary embodiment of the present invention.

Referring to FIG. 6, the transmitting end includes a data storage 601, a data constitutor 603, an ARQ controller 605, a transmitter 607, a receiver 609, a duplexer 611, an ARQ timer controller 613, an ARQ variable controller 615, and an ARQ control message generator 617.

The data storage 601 stores data generated by an application program. For example, the data storage 601 may be constituted in the form of a data queue.

The data constitutor 603 converts the data stored in the data storage 601 into a size to be transmitted by splitting or combining the data according to scheduling information.

The ARQ controller 605 generates ARQ blocks with the data provided from the data constitutor 603, and assigns sequence numbers to the ARQ blocks respectively.

The ARQ controller 605 controls the ARQ operations according to control information provided from the ARQ timer controller 613 and the ARQ variable controller 615.

The ARQ timer controller 613 manages the operation of the $T_{ARQ\_feedback\_arrival\_timer}$ timer, the $T_{ARQ\_feedback\_arrival\_timer\_2}$ timer, the $T_{message\_timer}$ timer, and $T_{ARQ\_feedback\_time}$ timer, which are driven to accurately receive the ARQ feedback information. For instance, the ARQ timer controller 613 resets the $T_{ARQ\_feedback\_arrival\_timer\_2}$ timer every time the ARQ controller 605 transmits new ARQ blocks.

The ARQ timer controller 613 resets the $T_{ARQ\_feedback\_arrival\_timer}$ timer every time the ARQ controller 605 transmits new $N_{ARQ\_feedback\_block}$ ARQ blocks.

The ARQ timer controller 613 resets the $T_{ARQ\_feedback\_arrival\_timer}$ timer every time the ARQ controller 605 terminates the $T_{ARQ\_feedback\_time}$ timer, which expires after operating for the $T_{ARQ\_feedback\_time}$ time.

The ARQ timer controller 613 resets the $T_{message\_timer}$ timer every time the ARQ controller 605 sends the ARQ feedback request message.

When the timer expires, the ARQ timer controller 613 sends expiration information of the corresponding timer to the ARQ controller 605. Based on the expiration information of the $T_{ARQ\_feedback\_arrival\_timer}$ timer and the $T_{ARQ\_feedback\_arrival\_timer\_2}$ timer provided from the ARQ timer controller 613, the ARQ controller 605 recognizes that the ARQ feedback from the receiving end is compromised. The ARQ controller 605 controls the ARQ control message generator 617 to send the ARQ feedback request message. Although it is not illustrated, the transmitting end includes at least one timer driven under the control of the ARQ timer controller 613.

Based on the expiration information of the $T_{message\_timer}$ timer provided from the ARQ timer controller 613, the ARQ controller 605 recognizes that the ARQ feedback request message sent to the receiving end is corrupted or the ARQ feedback transmitted from the receiving end is corrupted. The ARQ controller 605 controls the ARQ control message generator 617 to send the ARQ feedback request message.

Based on the expiration information of the $T_{ARQ\_feedback\_time}$ timer provided from the ARQ timer controller 613, the ARQ controller 605 can predict the ARQ feedback time of the receiving end.

The ARQ variable controller 615 controls the variables for the ARQ execution. For example, the ARQ variable controller 615 may store the $N_{ARQ\_feedback\_block}$ information agreed with the receiving end for the ARQ. In so doing, the ARQ variable controller 615 predicts the ARQ feedback time of the receiving end according to the number of the ARQ blocks transmitted to the receiving end at the ARQ controller 605, and provides the predicted ARQ feedback time to the ARQ controller 605.

The ARQ control message generator 617 generates the ARQ feedback request message to transmit to the receiving end under the control of the ARQ controller 605. The ARQ control message generator 617 generates the ARQ feedback request message including the ID information of the receiving end to which the transmitting end requests the ARQ feedback, the last ARQ block information acknowledged by the transmitting end, and the ARQ block information completely transmitted by the transmitting end.

The transmitter 607 includes a channel coding block, a modulation block, and a Radio Frequency (RF) processing block. The transmitter 607 converts the ARQ blocks and the ARQ feedback request message fed from the ARQ controller 605 into an RF signal and transmits the RF signal to the receiving end via the duplexer 611. For example, the channel coding block may include a channel encoder, an interleaver, and a modulator. The modulation block includes an Inverse Fast Fourier Transform (IFFT) operator in a case of an Orthogonal Frequency Division Multiplexing (OFDM) scheme, and includes a code spread modulator in a case of a Code Division Multiple Access (CDMA) scheme. The RF processing block converts the baseband signal output from the modulation block into an RF signal and outputs the RF signal over an antenna.

The receiver 609 includes an RF processing block, a demodulation block, and a channel decoding block. The receiver 609 converts and demodulates an RF signal output from the duplexer 611 into a baseband signal. The demodulation block includes an FFT operator for extracting data carried by subcarriers from the signal output from the RF processing block. The channel decoding block includes a demodulator, a deinterleaver, and a channel decoder.

The duplexer 611 transmits the transmit signal output from the transmitter 607 over an antenna and provides a signal received via the antenna to the receiver 609 according to a duplex manner.

As constructed above, the ARQ controller 605 can function as the ARQ timer controller 613, the ARQ variable controller 615, and the ARQ control message generator 617. Herein, they are separately provided to distinguish their functions. In the actual implementation, the ARQ controller 605 can process all or part of the functions of the ARQ timer controller 613, the ARQ variable controller 615, and the ARQ control message generator 617.

A description is provided below for a structure of the receiving end for the ARQ feedback by taking into account the number of the successfully received ARQ blocks and the $T_{ARQ\_feedback\_arrival\_timer}$ time.

Figure 7:
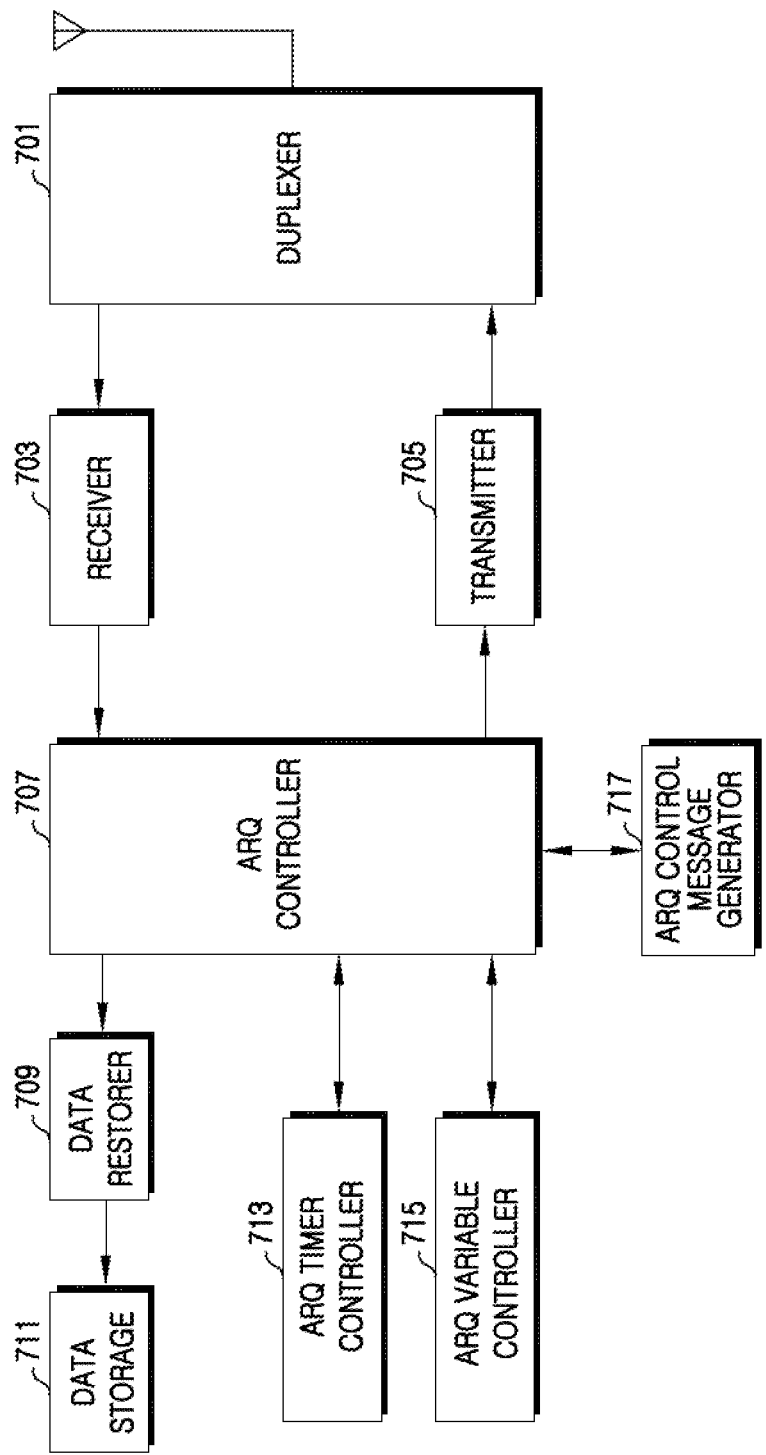
FIG. 7 illustrates a structure of a receiving end for an ARQ feedback in a wireless communication system according to an exemplary embodiment of the present invention.

FIG. 7 illustrates a structure of a receiving end for an ARQ feedback in a wireless communication system according to an exemplary embodiment of the present invention.

Referring to FIG. 7, the receiving end includes a duplexer 701, a receiver 703, a transmitter 705, an ARQ controller 707, a data restorer 709, a data storage 711, an ARQ timer controller 713, an ARQ variable controller 715, and an ARQ control message generator 717.

The duplexer 701 transmits a transmit signal output from the transmitter 705 over an antenna and forwards a signal received via the antenna to the receiver 703 according to a duplex manner.

The receiver 703 includes an RF processing block, a demodulation block, and a channel decoding block. The receiver 703 converts and demodulates the RF signal output from the duplexer 701 into a baseband signal. The demodulation block includes an FFT operator for extracting data carried by the subcarriers from the signal output from the RF processing block. The channel decoding block includes a demodulator, a deinterleaver, and a channel decoder.

The ARQ controller 707 confirms the sequence of the ARQ blocks output from the receiver 703 and checks for error in the ARQ blocks.

The ARQ controller 707 controls the ARQ operations according to the control information provided from the ARQ timer controller 713 and the ARQ variable controller 715.

Upon receiving the ARQ feedback request message transmitted by the transmitting end from the receiving end 703, the ARQ controller 707 recognizes that the transmitting end fails to receive the ARQ feedback. Thus, the ARQ controller 707 controls the ARQ control message generator 717 to generate the ARQ feedback message relating to the previous ARQ feedback information and the ARQ feedback information of the ARQ blocks successfully received until the ARQ feedback request message is received.

The data restorer 709 restores the original data of the data split or combined by the data generator 603 of the transmitting end, using the ARQ blocks successfully received at the ARQ controller 707 without error.

The data storage 711 stores the data restored by the data restorer 709, and provides the data to an application program. For example, the data storage 711 may be constructed in the form of a data queue.

The ARQ timer controller 713 manages the $T_{new\_packet\_arrival\_timer}$ timer and the $T_{ARQ\_feedback\_time}$ timer to confirm the ARQ feedback time. For example, the ARQ timer controller 713 may reset the $T_{new\_packet\_arrival\_timer}$ timer every time the ARQ controller 707 successfully receives the new ARQ blocks without error.

When the ARQ controller 707 succeeds to receive the ARQ blocks for the first time after the ARQ feedback, the ARQ timer controller 713 resets the $T_{ARQ\_feedback\_time}$ timer.

When the timer expires, the ARQ timer controller 713 transmits the expiration information of the corresponding timer to the ARQ controller 707. Based on the expiration information of the timer provided from the ARQ timer controller 713, the ARQ controller 707 controls the ARQ control message generator 717 to conduct the ARQ feedback. Although it is not illustrated, the receiving end includes at least one timer which is driven under the control of the ARQ timer controller 713.

The ARQ control message generator 717 generates the ARQ feedback message to transmit to the transmitting end under the control of the ARQ controller 707.

The ARQ variable controller 715 controls the variables for the ARQ execution. For example, the ARQ variable controller 715 may store the $N_{ARQ\_feedback\_block}$ $N_{ARQ\_feedback\_block}$ information agreed with the transmitting end for the ARQ. The ARQ variable controller 715 determines the ARQ feedback time according to the number of the ARQ blocks successfully received at the ARQ controller 707, and provides the determined ARQ feedback time to the ARQ controller 707.

The transmitter 705 includes a channel coding block, a modulation block, and an RF processing block. The transmitter 705 converts the ARQ feedback message output from the ARQ controller 707 into an RF signal and transmits the RF signal to the transmitting end via the duplexer 701. For example, the channel coding block may include a channel encoder, an interleaver, and a modulator. The modulation block includes an IFFT operator in a case of the OFDM scheme, and includes a code spread modulator in a case of the CDMA scheme. The RF processing block converts the baseband signal output from the modulation block into an RF signal and outputs the RF signal via an antenna.

As constructed above, the ARQ controller 707 can function as the ARQ timer controller 713, the ARQ variable controller 715, and the ARQ control message generator 717. Herein, they are separately provided to distinguish their functions. In the actual implementation, the ARQ controller 707 can process all or part of the functions of the ARQ timer controller 713, the ARQ variable controller 715, and the ARQ control message generator 717.

In this exemplary embodiment, the receiving end executes the ARQ feedback by taking into account the number of the successfully received ARQ blocks.

Figure 8:
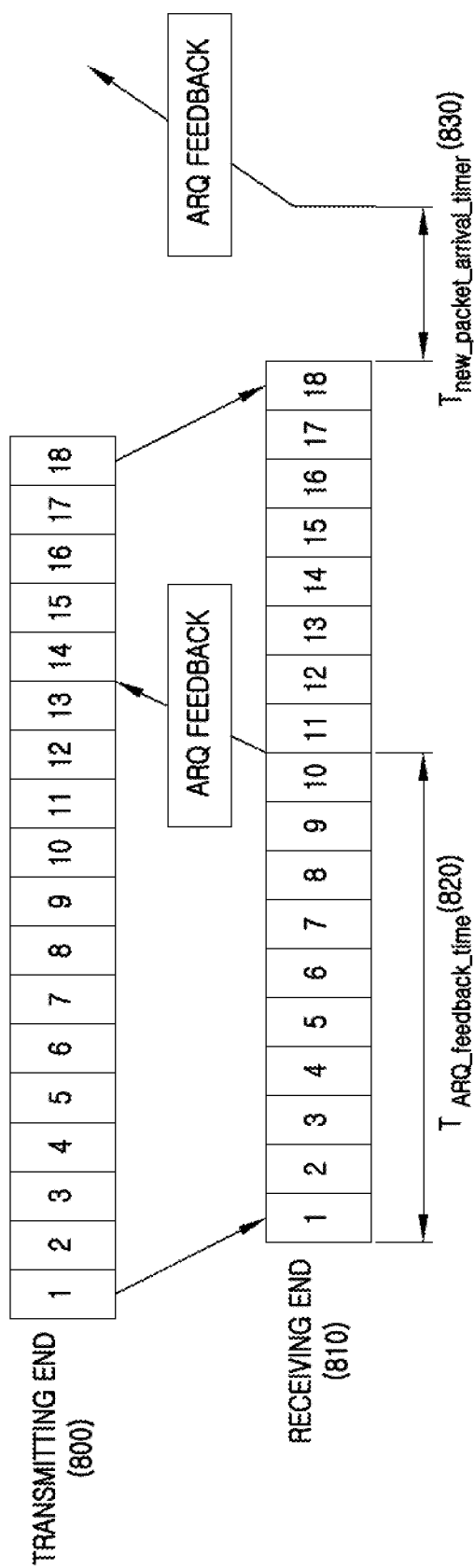
FIG. 8 illustrates an ARQ feedback condition at a receiving end in a wireless communication system according to still another exemplary embodiment of the present invention.

Alternatively, the receiving end may fulfill the ARQ feedback by considering the reception time of the ARQ blocks as illustrated in FIG. 8.

FIG. 8 depicts an ARQ feedback condition at a receiving end in a wireless communication system according to still another exemplary embodiment of the present invention.

Referring to FIG. 8, when the transmitting end 800 transmits 18 ARQ blocks to the receiving end 810, the receiving end 810 sends ARQ feedback information to the transmitting end 800 after the lapse of the $T_{ARQ\_feedback\_time}$ time 820. For instance, when successfully receiving the first ARQ block, the receiving end 810 resets the $T_{ARQ\_feedback\_time}$ timer, which expires after operating for the $T_{ARQ\_feedback\_time}$ time 820. Next, when successfully receiving up to the 10$^{th}$ ARQ block before the $T_{ARQ\_feedback\_time}$ timer expires, the receiving end 810 sends the ARQ feedback information of the first through 10$^{th}$ ARQ blocks to the transmitting end 800.

When receiving the 18$^{th}$ ARQ block and not receiving new ARQ blocks for the $T_{new\_packet\_arrival\_timer}$ time 830, the receiving end 810 performs the ARQ feedback. More specifically, when not receiving new ARQ blocks for the $T_{new\_packet\_arrival\_timer}$ time 830, the receiving end 810 recognizes that the transmitting end 800 did not additionally transmit ARQ packets. Hence, the receiving end 810 sends the ARQ feedback information relating to the 11$^{th}$ through 18$^{th}$ ARQ blocks successfully received to the transmitting end 800. At this time, when the 19$^{th}$ and 20 ARQ blocks are received within the $T_{new\_packet\_arrival\_timer}$ time 830 but are corrupted, the receiving end 810 recognizes that new ARQ blocks are not received at all.

The receiving end 810 resets the $T_{new\_packet\_arrival\_timer}$ timer, which expires after operating for the $T_{new\_packet\_arrival\_timer}$ time 830, every time the ARQ block is successfully received. Herein, the $T_{new\_packet\_arrival\_timer}$ timer is aborted when the receiving end 810 sends the ARQ feedback information so as to prevent the receiving end 810 from conducting the ARQ feedback while new ARQ packets are not received. The $T_{new\_packet\_arrival\_timer}$ timer is reset and operated when new ARQ packets are successfully received after the receiving end 810 sends the ARQ feedback information.

A description is provided below for a method for the ARQ feedback of the receiving end.

Figure 9:
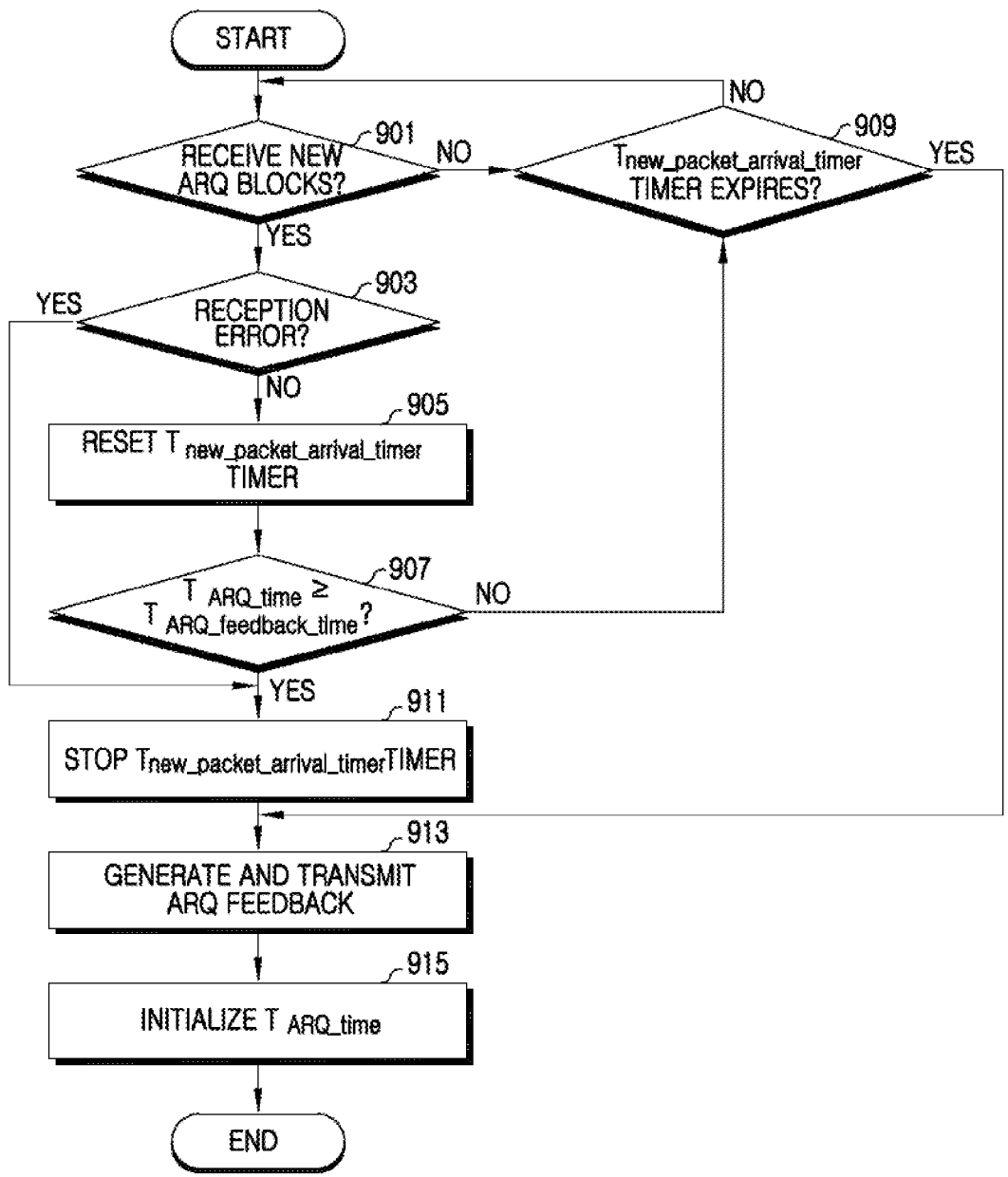
FIG. 9 illustrates an ARQ feedback method of a receiving end in a wireless communication system according to another exemplary embodiment of the present invention.

FIG. 9 illustrates the ARQ feedback method of a receiving end in a wireless communication system according to another exemplary embodiment of the present invention.

Referring to FIG. 9, in step 901, the receiving end determines whether ARQ blocks are received from the transmitting end.

If the ARQ blocks are not received, the receiving end determines whether the $T_{new\_packet\_arrival\_timer}$ timer, which expires after operating for the $T_{new\_packet\_arrival\_timer}$ $T_{new\_packet\_arrival\_timer}$ time, expires in step 909.

When the $T_{new\_packet\_arrival\_timer}$ timer expires, the receiving end generates and transmits the ARQ feedback information to the transmitting end in step 913.

When the $T_{new\_packet\_arrival\_timer}$ $T_{new\_packet\_arrival\_timer}$ timer is not operating or has not expired, the receiving end returns to step 901 to determine whether ARQ blocks are received from the transmitting end.

Upon receiving the ARQ blocks in step 901, the receiving end checks for error in the received ARQ blocks in step 903.

When the ARQ blocks are corrupted, the receiving end stops the $T_{new\_packet\_arrival\_timer}$ timer in step 911.

In contrast, when the ARQ blocks are free from error, the receiving end resets the $T_{new\_packet\_arrival\_timer}$ timer in step 905. Herein, the resetting of the $T_{new\_packet\_arrival\_timer}$ timer indicates the initialization and the operation of the timer.

In step 907, the receiving end determines whether to perform the ARQ feedback by taking into account the ARQ elapsed time $T_{ARQ\_time}$. More specifically, when the ARQ elapsed time exceeds the $T_{ARQ\_feedback\_time}$ time, the receiving end performs the ARQ feedback. To determine whether to perform the ARQ feedback, the receiving end compares $T_{ARQ\_time}$ and $T_{ARQ\_feedback\_time}$. Herein, the ARQ elapsed time indicates the time taken from the first reception time of the ARQ blocks after the ARQ feedback to the reception time of the current ARQ blocks.

When $T_{ARQ\_time}$ is less than $T_{ARQ\_feedback\_time}$, the receiving end determines not to execute the ARQ feedback. Thus, the receiving end proceeds to step 909 and determines whether the $T_{new\_packet\_arrival\_timer}$ timer reset in step 905 expires.

When the $T_{new\_packet\_arrival\_timer}$ timer has not expired, the receiving end returns to step 901 to determine whether ARQ blocks are received from the transmitting end.

In contrast, when the $T_{new\_packet\_arrival\_timer}$ $T_{new\_packet\_arrival\_timer}$ timer expires, the receiving end generates and transmits the ARQ feedback information to the transmitting end in step 913.

When $T_{ARQ\_time}$ is equal to or greater than $T_{ARQ\_feedback\_time}$ in step 907, the receiving end determines to carry out the ARQ feedback. Hence, the receiving end stops the $T_{new\_packet\_arrival\_timer}$ timer reset in step 903, in step 911. In other words, the receiving end stops the $T_{new\_packet\_arrival\_timer}$ timer in order to avoid the ARQ feedback other than the ARQ feedback determined in step 907.

In step 913, the receiving end generates and transmits the ARQ feedback information to the transmitting end.

In step 915, the receiving end initializes $T_{ARQ\_time}$ indicative of the transmission time of the successfully received ARQ blocks.

Next, the receiving end finishes this process.

In this exemplary embodiment, before generating the ARQ feedback information, the receiving end stops the $T_{new\_packet\_arrival\_timer}$ timer. The receiving end initializes $T_{ARQ\_time}$ after sending the ARQ feedback information.

Alternatively, the receiving end may stop the $T_{new\_packet\_arrival\_timer}$ timer and initialize $T_{ARQ\_time}$ before generating the ARQ feedback information.

When the ARQ blocks are corrupted, the receiving end stops the $T_{new\_packet\_arrival\_timer}$ timer in step 911.

Alternatively, when the ARQ blocks are corrupted, the receiving end may proceed to step 913.

Now, a description is provided for a method of the transmitting end to receive the ARQ feedback information by considering the $T_{ARQ\_feedback\_arrival\_timer}$ time, the $T_{ARQ\_feedback\_arrival\_timer\_2}$ time, and the $T_{message\_timer}$ time.

Figure 10:
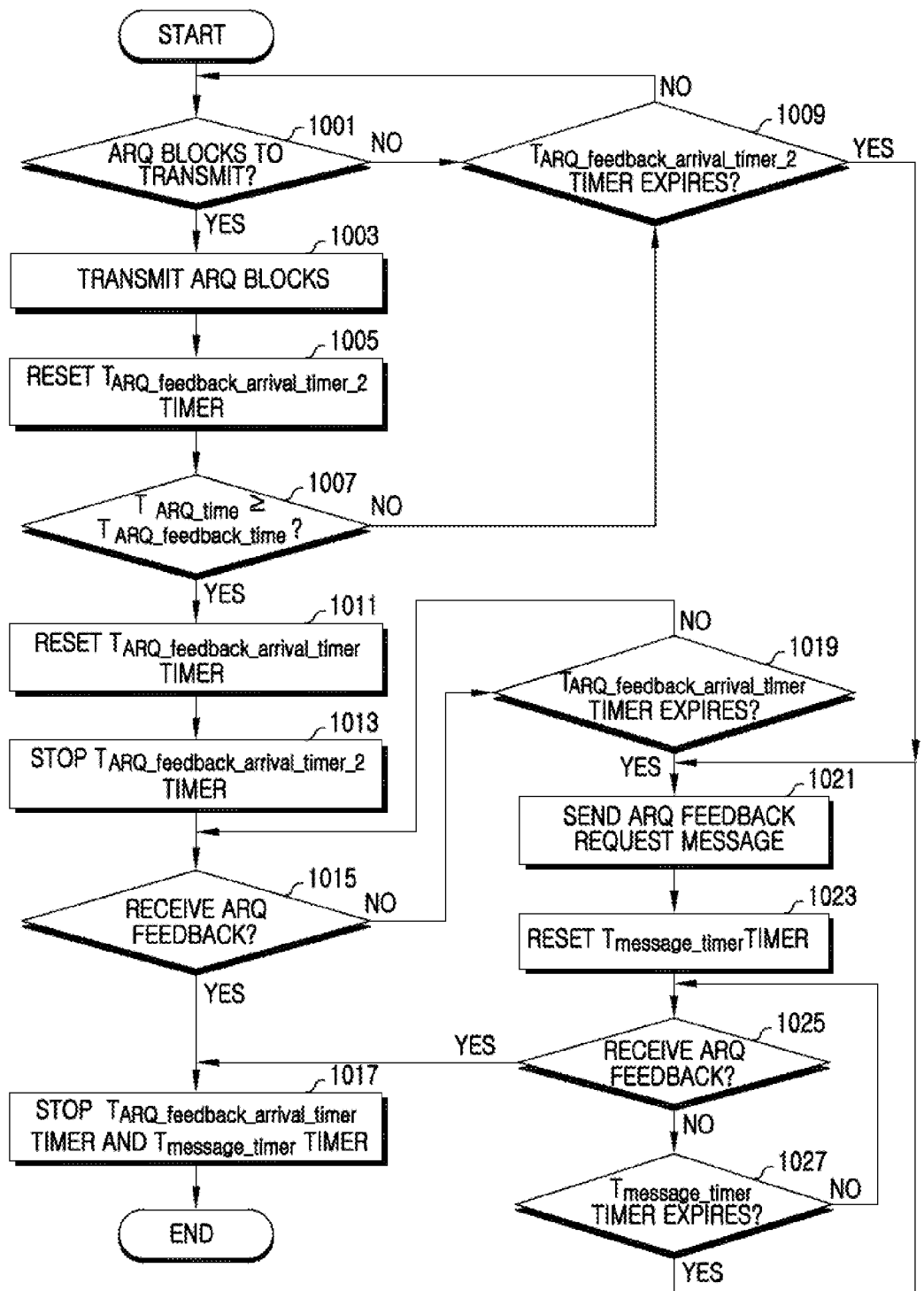
FIG. 10 illustrates a method of a transmitting end for an ARQ feedback in a wireless communication system according to an exemplary embodiment of the present invention.

FIG. 10 illustrates a method of a transmitting end for an ARQ feedback in a wireless communication system according to another exemplary embodiment of the present invention.

Referring to FIG. 10, in step 1001, the transmitting end determines whether there exist ARQ blocks to transmit to the receiving end.

When there are no ARQ blocks to transmit to the receiving end, the transmitting end determines whether the $T_{ARQ\_feedback\_arrival\_timer\_2}$ timer, which expires after operating for the $T_{ARQ\_feedback\_arrival\_timer\_2}$ time, expires in step 1009.

When the $T_{ARQ\_feedback\_arrival\_timer\_2}$ timer expires, the transmitting end sends the ARQ feedback request message to the receiving end in step 1021.

When the $T_{ARQ\_feedback\_arrival\_timer\_2}$ timer is not operating or has not expired, the transmitting end returns to step 1001 and determines whether there exist ARQ blocks to transmit to the receiving end.

When there exist the ARQ blocks to transmit to the receiving end in step 1001, the transmitting end transmits the ARQ blocks to the receiving end in step 1003.

In step 1005, the transmitting end resets the $T_{ARQ\_feedback\_arrival\_timer\_2}$ timer. Herein, the resetting of the $T_{ARQ\_feedback\_arrival\_timer\_2}$ timer initializes and drives the timer.

In step 1007, the transmitting end predicts whether the receiving end will perform the ARQ feedback, by taking into account the transmission time of the ARQ blocks $T_{ARQ\_time}$ to the receiving end. In more detail, when the $T_{ARQ\_feedback\_time}$ time elapses, the receiving end performs the ARQ feedback. To predict whether the receiving end will conduct the ARQ feedback, the transmitting end compares $T_{ARQ\_time}$ with $T_{ARQ\_feedback\_time}$.

When $T_{ARQ\_time}$ is less than $T_{ARQ\_feedback\_time}$, the transmitting end predicts that the receiving end does not perform the ARQ feedback. Accordingly, the transmitting end proceeds to step 1009 and determines whether the $T_{new\_packet\_arrival\_timer\_2}$ timer reset in step 1005 expires.

When the $T_{new\_packet\_arrival\_timer\_2}$ timer has not expired, the transmitting end returns to step 1001 and determines whether there exist ARQ blocks to transmit to the receiving end.

When the $T_{new\_packet\_arrival\_timer\_2}$ timer expires, the transmitting end sends the ARQ feedback request message to the receiving end in step 1021. Herein, the ARQ feedback request message includes the ID information of the receiving end to which the transmitting end requests the ARQ feedback, the last ARQ block information acknowledged by the transmitting end, and the ARQ block information completely transmitted by the transmitting end.

When $T_{ARQ\_time}$ is greater than or equal to $T_{ARQ\_feedback\_time}$ in step 1007, the transmitting end predicts that the receiving end will conduct the ARQ feedback. In step 1011, the transmitting end resets the $T_{ARQ\_feedback\_arrival\_timer}$ timer, which expires after operating for the $T_{ARQ\_feedback\_arrival\_timer}$ time.

In step 1013, the transmitting end stops the operation of the $T_{ARQ\_feedback\_arrival\_timer\_2}$ timer reset in step 1005.

In step 1015, the transmitting end determines whether the ARQ feedback information is received.

When receiving no ARQ feedback information, the transmitting end determines whether the $T_{ARQ\_feedback\_arrival\_timer}$ timer reset in step 1011 expires in step 1019.

When the $T_{ARQ\_feedback\_arrival\_timer}$ timer has not expired, the transmitting end returns to step 1015 and determines whether the ARQ feedback information is received.

When the $T_{ARQ\_feedback\_arrival\_timer}$ timer expires, the transmitting end sends the ARQ feedback request message to the receiving end in step 1021.

In step 1023, the transmitting end resets the $T_{message\_timer}$ timer, which expires after operating for the $T_{message\_timer}$ time.

In step 1025, the transmitting end determines whether the ARQ feedback information is received from the receiving end.

Upon receiving the ARQ feedback information, the transmitting end stops the $T_{ARQ\_feedback\_arrival\_timer}$ timer and the $T_{message\_timer}$ timer in step 1017.

When receiving no ARQ feedback information, the transmitting end determines whether the $T_{message\_timer}$ timer reset in step 1023 expires in step 1027.

When the $T_{message\_timer}$ timer has not expired, the transmitting end returns to step 1025 and determines whether the ARQ feedback information is received from the receiving end.

In contrast, when the $T_{message\_timer}$ timer expires, the transmitting end returns to step 1021 and sends the ARQ feedback request message to the receiving end.

When receiving the ARQ feedback information in step 1015, the transmitting end stops the $T_{ARQ\_feedback\_arrival\_timer}$ timer and the $T_{message\_timer}$ timer in step 1017.

Next, the transmitting end finishes this process.

As set forth above, the ARQ feedback is carried out by taking into consideration the number of the ARQ blocks successfully received at the receiving end of the wireless communication system, and the timer for transmitting and receiving the ARQ feedback is driven to reduce the loss of the ARQ feedback information. Therefore, the shift of the transmit window of the transmitting can be accurately accomplished and the transmission reliability can be raised.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing Automatic Repeat reQuest (ARQ) feedback to transmit an indication of one of success and failure of reception of at least one ARQ block to a transmitting end at a receiving end in a wireless communication system, the method comprising:
   when receiving a first new ARQ block from the transmitting end, initializing a timer;
   when receiving a second new ARQ block from the transmitting end, initializing the timer; and
   when the timer expires, performing the ARQ feedback.

2. The method of claim 1, further comprising:
   when the ARQ feedback is performed, stopping a driving of the timer.

3. The method of claim 1, further comprising:
   when the new ARQ block is received, identifying a number of contiguous ARQ blocks that do not perform the ARQ feedback;
   determining whether to perform the ARQ feedback by taking into account the number of the ARQ blocks;
   when determining to perform the ARQ feedback, performing the ARQ feedback in relation to the at least one ARQ block; and
   when determining not to perform the ARQ feedback, identifying whether the timer expires.

4. The method of claim 1, further comprising:
   when the new ARQ block is received, identifying an elapsed time from a reception time of the first ARQ block to the reception time of the new ARQ block;
   determining whether to perform the ARQ feedback by taking into account the elapsed time;
   when determining to perform the ARQ feedback, carrying out the ARQ feedback in relation to at least one ARQ block; and
   when determining not to perform the ARQ feedback, identifying whether the timer expires.

5. The method of claim 1, further comprising:
   determining at least one variable for the ARQ feedback comprising at least one of a driving time of the timer, the number of ARQ blocks for the ARQ feedback, and an elapsed time for the ARQ feedback using at least one of a registration procedure with a serving base station, a connection initial setup procedure with the serving base station, a service initial setup procedure with the serving base station, a connection change procedure with the serving base station, and a service change procedure with the serving base station.

6. The method of claim 1, further comprising:
   when the new ARQ block is received, identifying whether there is missed ARQ block;
   when at least one of missed ARQ block, performing the ARQ feedback; and
   when there is no missed ARQ block, initializing the timer.

7. A method for identifying Automatic Repeat reQuest (ARQ) feedback information indicative of one of reception success and failure of at least one ARQ block transmitted from a receiving end, at a transmitting end in a wireless communication system, the method comprising:
   to transmit the ARQ block, initializing a timer; and
   when the timer expires, requesting the ARQ feedback to the receiving end.

8. The method of claim 7, further comprising:
   when the ARQ feedback information is received before the timer expires, stopping a driving of the timer.

9. The method of claim 7, further comprising:
   to transmit the ARQ block, identifying the number of ARQ blocks transmitted to the receiving end but not identified with the ARQ feedback information;
   estimating an ARQ feedback time of the receiving end by taking into account the number of the ARQ blocks;
   when the ARQ feedback time of the receiving end arrives, initializing a second timer;
   when the ARQ feedback information is received before the second timer expires, stopping the driving of the second timer; and
   when the second timer expires, requesting the ARQ feedback to the receiving end.

10. The method of claim 7, further comprising:
    to transmit the ARQ block, identifying an elapsed time from the transmission time of the first ARQ block to the transmission time of the ARQ block;
    estimating the ARQ feedback time of the receiving end by taking into account the elapsed time;
    when the ARQ feedback time of the receiving end arrive, initializing a second timer;
    when the ARQ feedback information is received before the second timer expires, stopping the driving of the second timer; and
    when the second timer expires, requesting the ARQ feedback to the receiving end.

11. A method for identifying Automatic Repeat reQuest (ARQ) feedback information indicative of one of reception success and failure of at least one ARQ block transmitted from a receiving end, at a transmitting end in a wireless communication system, the method comprising:

to transmit the ARQ block, identifying the number of ARQ blocks transmitted to the receiving end but not identified with the ARQ feedback information or an elapsed time from a transmission time of a first ARQ block to the transmission time of the ARQ block;

estimating the ARQ feedback time of the receiving end by taking into account the number of ARQ blocks or the elapsed time;

when the ARQ feedback time of the receiving end arrive, initializing a timer; and when the timer expires, requesting the ARQ feedback to the receiving end.

12. The method of claim 11, further comprising:
when the ARQ feedback information is received before the timer expires, stopping a driving of the timer.

13. An apparatus for performing Automatic Repeat reQuest (ARQ) feedback to transmit an indication of one of success and failure of reception of at least one ARQ block to a transmitting end at a receiving end in a wireless communication system, the apparatus comprising:
a receiver for receiving the ARQ block;
a timer for initializing, when receiving a new ARQ block from the transmitting end;
a ARQ controller for controlling to perform the ARQ feedback when the timer is expired; and
a transmitter for transmitting the ARQ feedback information to the transmitting end under control of the ARQ controller,
wherein the timer initializes when receiving a new ARQ block before the timer expires.

14. The apparatus of claim 13, wherein,
when the ARQ feedback is performed under the control of the ARQ controller, the timer stops a driving.

15. The apparatus of claim 13, further comprising:
an ARQ variable controller for determining at least one variable for the ARQ feedback comprising at least one of a driving time of the timer, the number of ARQ blocks for the ARQ feedback, and an elapsed time for the ARQ feedback using at least one of a registration procedure with a serving base station, a connection initial setup procedure with the serving base station, a service initial setup procedure with the serving base station, a connection change procedure with the serving base station, and a service change procedure with the serving base station, and for determining whether to perform the ARQ feedback using the least one variable for the ARQ feedback,
wherein, when the ARQ variable controller determines to perform the ARQ feedback, the ARQ controller controls to carry out the ARQ feedback in relation to at least one ARQ block received without error.

16. The apparatus of claim 15, wherein the ARQ variable controller determines whether to perform the ARQ feedback by taking into account one of the number of contiguous ARQ blocks that do not perform the ARQ feedback, and an elapsed time from a reception time of the first ARQ block to a reception time of the ARQ block.

17. The apparatus of claim 13, wherein, when the new ARQ block received, the ARQ controller identifies whether there is missed ARQ block, and performs the ARQ feedback when at least one of missed ARQ block.

18. An apparatus for identifying Automatic Repeat reQuest (ARQ) feedback information indicative of one of reception success and failure of at least one ARQ block transmitted from a receiving end, at a transmitting end in a wireless communication system, the apparatus comprising:
an ARQ controller for generating one or more ARQ blocks, for assigning a sequence to the ARQ blocks, and for controlling to request ARQ feedback to the receiving end when expired a timer;
a transmitter for transmitting the ARQ blocks; and
the timer for initializing when the transmitter transmits the ARQ blocks.

19. The apparatus of claim 18, wherein the timer stops when receiving an ARQ feedback information before the timer expires.

20. The apparatus of claim 18, further comprising:
an ARQ variable controller for estimating an ARQ feedback time of the receiving end by taking into account one of the number of ARQ blocks transmitted to the receiving end but not identified with the ARQ feedback information, and an elapsed time from a transmission time of the first ARQ block; and
a second timer for initializing when the ARQ feedback time of the receiving end arrive,
wherein, when the ARQ controller controls to request ARQ feedback to the receiving end when the second timer expires.

21. An apparatus for identifying Automatic Repeat reQuest (ARQ) feedback information indicative of one of reception success and failure of at least one ARQ block transmitted from a receiving end, at a transmitting end in a wireless communication system, the apparatus comprising:
a transmitter for transmitting the ARQ blocks;
an ARQ variable controller for estimating an ARQ feedback time of the receiving end by taking into account the number of ARQ blocks transmitted to the receiving end but not identified with the ARQ feedback information or an elapsed time from a transmission time of a first ARQ block to the transmission time of the ARQ block;
a timer for initializing when the ARQ feedback time of the receiving end arrive; and
an ARQ controller for controlling to request ARQ feedback to the receiving end when a timer expires.

22. The apparatus of claim 21, wherein the timer stops when receiving a ARQ feedback information before the timer expires.

* * * * *